(12) United States Patent
Fujiwara

(10) Patent No.: US 7,148,916 B2
(45) Date of Patent: Dec. 12, 2006

(54) PHOTOGRAPHING SYSTEM

(75) Inventor: Akihiro Fujiwara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 955 days.

(21) Appl. No.: 09/893,611

(22) Filed: Jun. 29, 2001

(65) Prior Publication Data

US 2002/0009300 A1  Jan. 24, 2002

(30) Foreign Application Priority Data

Jul. 3, 2000  (JP) .............................. 2000-201262

(51) Int. Cl.
*H04N 5/225* (2006.01)
*H04N 13/00* (2006.01)
*G03B 35/00* (2006.01)
*H04N 5/262* (2006.01)

(52) U.S. Cl. .................... 348/207.99; 348/42; 396/324

(58) Field of Classification Search ...................... None
See application file for complete search history.

(56) References Cited

U.S. PATENT DOCUMENTS

| 5,455,647 | A | | 10/1995 | Fujiwara ..................... 353/101 |
| 5,726,704 | A | * | 3/1998 | Uomori ........................ 348/47 |
| 6,141,036 | A | * | 10/2000 | Katayama et al. ............. 348/47 |
| 6,751,020 | B1 | * | 6/2004 | Sugawara ..................... 396/324 |
| 6,762,794 | B1 | * | 7/2004 | Ogino .......................... 348/47 |
| 6,862,140 | B1 | * | 3/2005 | Ogino .......................... 359/473 |
| 6,864,910 | B1 | * | 3/2005 | Ogino et al. .................. 348/42 |
| 6,888,563 | B1 | * | 5/2005 | Suzuki et al. ................. 348/42 |
| 2004/0201764 | A1 | * | 10/2004 | Honda et al. ........... 348/333.01 |

* cited by examiner

*Primary Examiner*—David Ometz
*Assistant Examiner*—Luong Nguyen
(74) *Attorney, Agent, or Firm*—Fitzpatrick, Cella, Harper & Scinto

(57) ABSTRACT

A photographing lens unit, a photographing apparatus, and a photographing system are capable of always reproducing good stereoscopic images. Information regarding the focal length of a photographing optical system, a base line length, which is the interval between the incident optical axes of a first photographing optical axis and a second photographing optical axis for left eye and right eye, respectively, and information regarding the angle of convergence, which is the angle formed by the incident optical axes of the first photographing optical axis and the second photographing optical axis, are transmitted from a controller of the photographing lens unit to a camera main unit in the form of digital values. In the camera main unit, the foregoing information and information regarding whether the odd!even field of an input picture signal corresponds to a picture signal for left eye or right eye are recorded onto a recording medium in the form of digital values, together with picture signals or speech/sound signals.

11 Claims, 6 Drawing Sheets

PHOTOGRAPHING SYSTEM

BACKGROUND OF THE INVENTION

1. Field of the Invention

The present invention relates to a photographing lens unit for a stereoscopic or "3-D" photographing lens unit, a photographing apparatus, and a photographing lens system.

2. Description of the Related Art

FIG. 6 shows the configuration of a stereoscopic photographing lens unit according to a conventional example. The basic configuration of a stereoscopic photographing and recording apparatus will be explained with reference to FIG. 6. The stereoscopic photographing and recording apparatus employs a field time sharing method, and is based on an interlaced video system as in the NTSC. Specifically, images equivalent to those viewed by one eye and images equivalent to those viewed by the other eye are sorted into odd fields and even fields.

Referring to FIG. 6, an optical system is separated into right and left sections at the end adjacent to an object, and adapted to admit a right beam or a left beam of light, respectively, by the function of liquid crystal shutters 81R and 81L disposed on the right and left sides, respectively.

The beams of light are merged into a single beam of light by mirrors 82R, 82L, and 83, and pass through a stop 84 so as to be formed into an image at an image pick-up device 88 through lenses 85, 86, and 87. At a given timing, only one of the right and left beam of light reaches an imaging surface.

A picture signal obtained by photoelectrically converting the beam of light formed into an image on the imaging surface as described above is recorded onto a recording medium.

Among several different types of information involved in stereoscopic photography, there are some types of information required to view a stereoscopic image properly at the stage of display.

The information required for the above stereoscopic photographing includes:

(1) Angles of view of an image (vertical and horizontal), (2) Length of base line: Distance between the points corresponding to right and left eyes, respectively (pupil distance), (3) Angle of convergence: Inward angles (in degrees) of the optical axes of the right and left eyes, (4) Whether the odd/even of a field corresponds to left/right or right/left, and (5) Distance to a subject (Value measured by a ranging system, such as an AF system).

Supplementary information includes:

(6) Information regarding an aperture, and (7) Shutter speed.

The various types of information mentioned above are distributed among an optical unit (lens unit) and a photographing unit (the main unit of a camera) as follows:

(1) Optical unit is responsible for information regarding:

(a) Focal length, (b) Length of base line, (c) Angle of convergence, and (d) Distance to a subject (AF system).

(2) Photographing unit is responsible for information regarding:

(a) Size of a photographing area of an image pickup device, such as a CCD, (b) Photoelectric conversion cumulating timing of an image pick-up device, such as a CCD (Time of lag from synchronizing signal), and (c) Whether a field is an odd or even number.

When viewing a stereoscopic image, in order to reproduce a further improved three-dimensional appearance thereof, it is desired to properly set the size of a display device and the distance from a viewer to the display device.

For instance, if a person who is 170 cm high is standing at a 3-meter distance, and the angle of view is set so that the person is exactly fitted from the top to bottom of a screen, and the angle of convergence is set to the person at the 3-meter distance, then a screen measuring 170 cm vertically should be disposed at a distance of three meters to directly reproduce and display a stereoscopic image in order to reproduce the image with fidelity.

The relationship between even/odd and left/right of a field is saved in the form of even/odd of the field of a recording picture signal. Hence, as long as the defined relationship in a photographing apparatus is known, right and left images can be correctly reproduced.

Furthermore, if the angle of view, parallax, the angle of convergence, etc. are known, then good images can be reproduced, depending on a display device or setting, such as a viewing distance, thereof.

The angle of view can be obtained by conversion based on the focal length of an optical system if the size of a photographing area of an image pick-up device (CCD) has been decided.

A proper set value for the distance between a display device and a viewer can be determined from the distance to a subject and the angle of view.

However, in the conventional photographing and recording apparatus described above, the above-mentioned information is not recorded onto a recording medium wherein images have been recorded, thus presenting a problem in that only the recording medium to which images have been merely recorded is handed to a third party, and good three dimensional images cannot always be reproduced if the images are viewed at an improper setting.

An incorrect left/right relationship, in particular, has resulted not only in the loss of a three-dimensional appearance but an awkward appearance of images also in some cases.

SUMMARY OF THE INVENTION

The present invention has been made with a view toward solving the above problem, and it is an object of the invention to provide a photographing lens unit, a photographing apparatus, and a photographing system that are capable of always reproducing good stereoscopic images.

To this end, according to one aspect of the present invention, there is provided a stereoscopic photographing lens unit that is mounted on a camera main unit, and has a first photographing optical axis and a second photographing optical axis, the stereoscopic photographing lens unit having control means for controlling a photographing optical system, and transmitting means for transmitting predetermined information of the photographing optical system, including control information provided by the control means, to the camera main unit.

According to another aspect of the present invention, there is provided a stereoscopic photographing apparatus that has a first photographing optical axis and a second photographing optical axis, and that switches picture signals for the left eye and right eye, respectively, for each field through the intermediary of the respective photographic optical axes before inputting an image. The photographing apparatus includes control means for controlling a photographing optical system and recording means for recording predetermined information of the photographing optical system, including control information provided by the control means, and information regarding whether the odd/even field of an input picture signal corresponds to a picture signal for the left eye or the right eye to a recording medium in the form of digital values, together with picture signals or picture signals and speech signals.

Further objects, features and advantages of the present invention will become apparent from the following description of the preferred embodiments (with reference to the attached drawings).

BRIEF DESCRIPTION OF THE DRAWINGS

FIGS. 1A to 1D show a configuration of a photographing lens unit according to a first embodiment of the present invention;

DESCRIPTION OF THE PREFERRED EMBODIMENTS

Embodiments according to the present invention will be described in conjunction with the accompanying drawings.

(First Embodiment)

FIG. 1 shows a configuration of a photographing lens unit according to a first embodiment. Referring to FIG. 1, the optical and mechanical constructions of the photographing lens unit will be described.

Figure 1A:
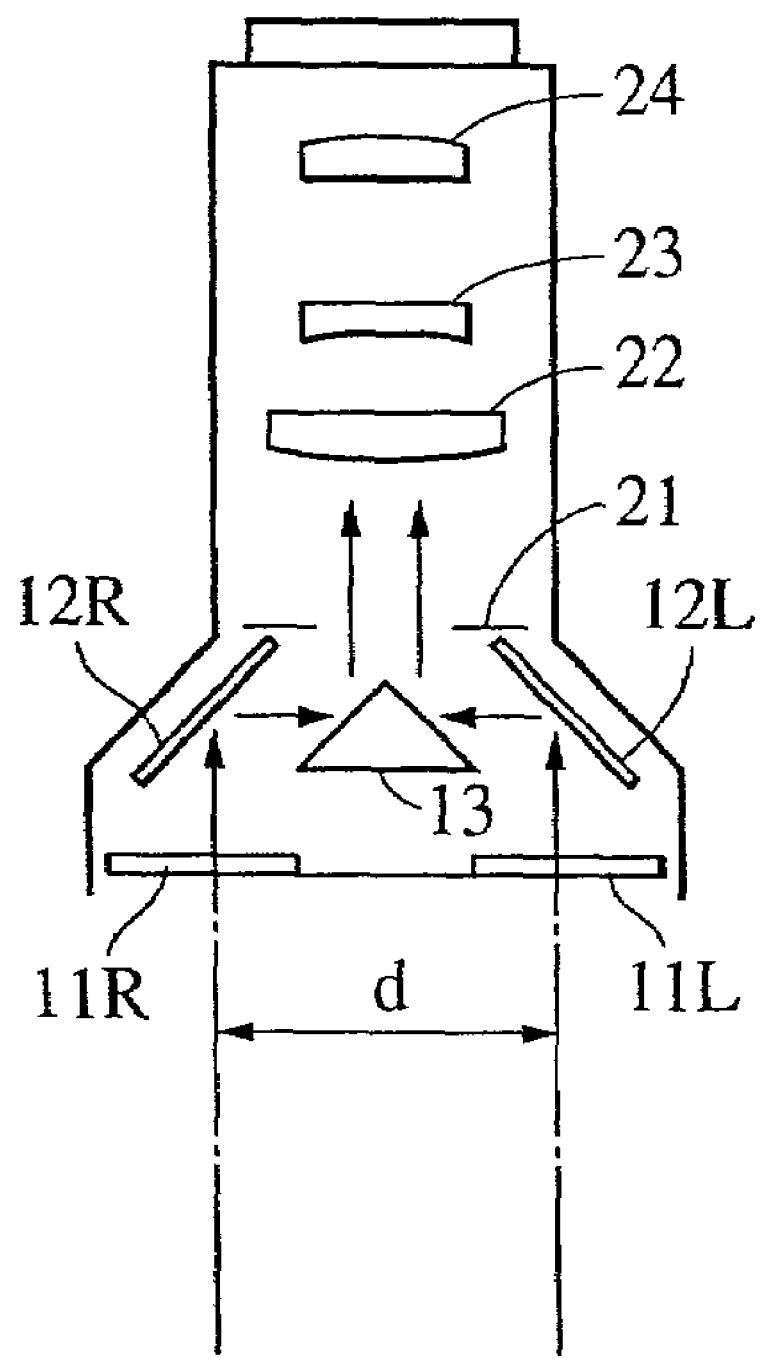

Referring to FIG. 1A, which is a top view, the optical system at the end adjacent to an object is separated into right and left sections. Liquid crystal shutters 11R and 11L disposed for the right eye and the left eye, respectively, operate to admit only one beam of light through either the liquid crystal shutter 11R or 11L.

The beams of light are merged into a single beam of light by mirrors 12R, 12L, and 13, and the resultant beam of light passes through a stop 21 to be formed into an image on an imaging surface via lenses 22, 23, and 24.

FIG. 1B is a front view of the lens unit shown in FIG. 1A.

FIG. 1C is a detailed diagram of a mirror mechanism of the mirrors 12R and 12L.

Referring to FIGS. 1B and 1C, when a rotary knob 15 is manually turned, a screw attached to the shaft of the rotary knob 15 moves two plate arms 14R and 14L. The respective arms circularly move about rotating shafts 14RC and 14LC to allow the orientation of the mirrors 12R and 12L, which are fixed onto the plate arms, to be changed thereby to change the angle of convergence.

The rotary knob 15 is also turned to rotate the shaft of a variable resistor 16. By reading a resistance value of the variable resistor 16, the rotational angles of the mirrors 12R and 12L can be known.

FIG. 1D is a front view showing the mechanical structure of the lens unit.

Figure 2:
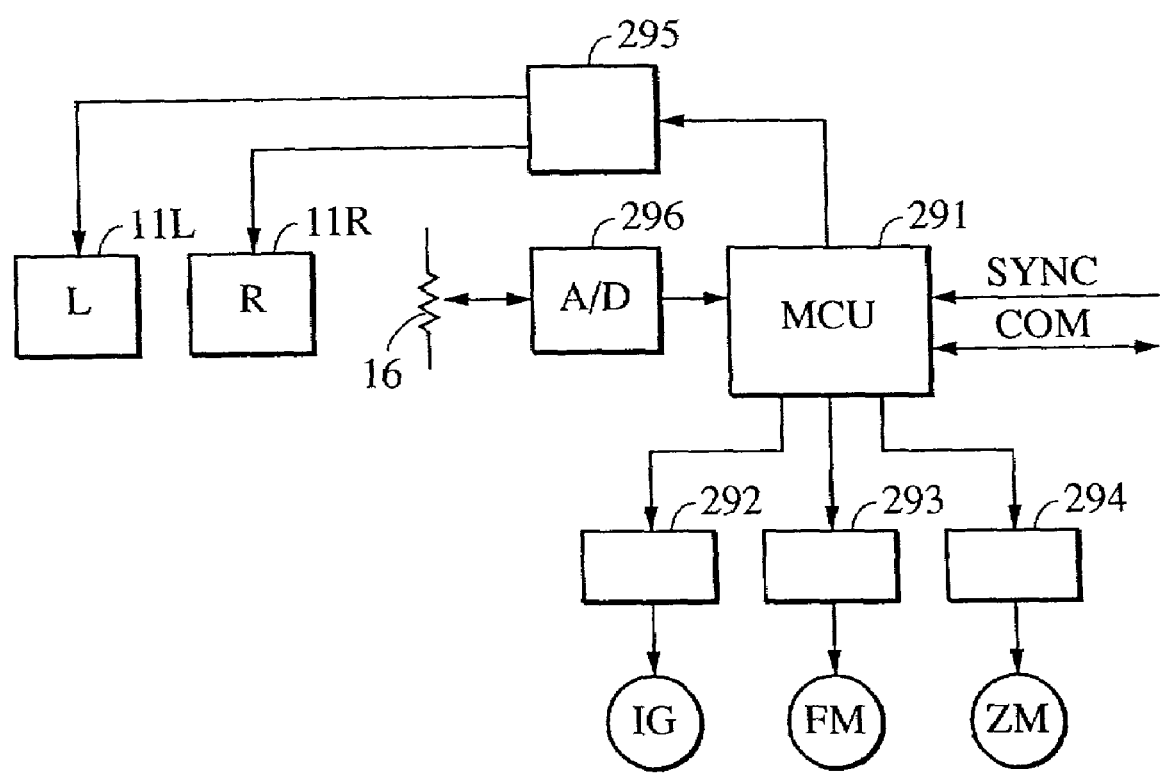
FIG. 2 is a circuit block diagram showing a configuration of a control unit according to the first embodiment.

FIG. 2 is a circuit block diagram showing a configuration of a controller of the photographing lens unit shown in FIG. 1. In conjunction with FIG. 2, the configuration of an electronic control section will be described.

Referring to FIG. 2, a microcomputer unit (hereinafter referred to simply as "MCU") 291 controls the entire photographing lens unit. Reference numerals 11R and 11L denote the liquid crystal shutters already mentioned above, and reference numeral 295 denotes a driving circuit for the shutters. Driving timings are supplied in terms of synchronization signals (SYNC) from an external photographing camera, namely, the main unit of a camera, to the MCU and generated therein.

The output voltages of the variable resistor 16 for detecting the angles of convergence are converted into digital values by an A/D converter 296, and read into the MCU 291.

The MCU 291 also carries out other types of lens control in parallel. The following will describe specific processing.

The MCU 291 controls an iris (IG) through the intermediary of a driving circuit 292.

To control the optical system, a pulse motor is driven by motor drivers 293 and 294 thereby to control a focusing motor (FM) and a zooming motor (ZM). Reset position detection switches (not shown) are connected to the respective motors so as to allow the initial positions thereof to be known. A method for finding a focal length by detecting a lens position has been disclosed in, for example, the specification and drawings of Patent No. 02807488 under the title of invention "Lens position controller and camera"; therefore, the description of the method will be omitted.

In the configuration explained above, the MCU 291 first detects the focal length of a lens from the control position of the ZM, and obtains information regarding the angle of convergence from a reading of an output voltage of the variable resistor 16. The detected values are digital.

In this embodiment, a base line length d is fixed (see FIG. 1), and stored beforehand in a memory, which is a recording medium in the MCU 291; hence, the same value will always be output.

Through a serial communication port (COM), these pieces of information can be transmitted to an external device, namely, the main unit of a camera via a mounting contact.

Thus, the MCU 291 and the communication port make up a transmitting means for transmitting the information regarding the focal length and the angle of convergence of a lens, which is the control information of the MCU 291, and the information regarding the base line length stored in the memory in the MCU 291 to an external device, namely, the main unit of a camera.

Figure 3:
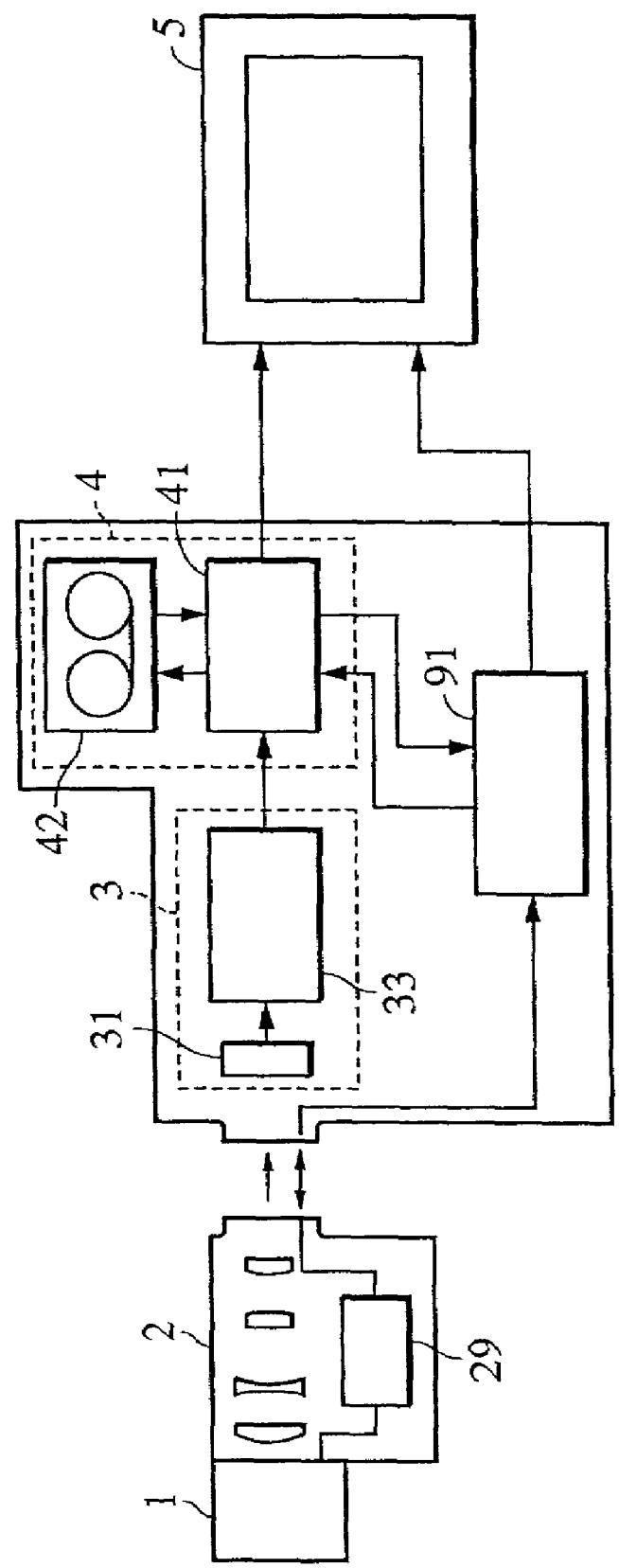
FIG. 3 shows a configuration of a photographing system according to the first embodiment.

FIG. 3 shows the configuration of a photographing system that employs the aforesaid photographing lens unit or interchangeable lens unit.

First, the interchangeable lens unit will be described.

Referring to FIG. 3, reference numeral 1 denotes an optical unit 1 for stereoscopic photographing, and reference numeral 2 denotes an image forming optical unit 2 having a zooming function and a focusing function. A microcomputer 29 controls the optical unit 1 and the optical system of the image forming optical unit 2, and has information regarding angles of convergence, focal lengths, and base line lengths.

A camcorder will now be described.

Reference numeral 3 denotes a camera unit. An image obtained by the optical system described above is formed on an image pick-up device (CCD) 31. An output of the image pick-up device is processed by a signal processing circuit (Cam) 33 in the following stage so as to be converted into digital picture signals. The digital signals are transmitted to a recording circuit (Rec) 41 of the following stage.

Reference numeral 4 denotes a recorder unit that permits recording of speech/sound signals that have been converted into digital values (not shown) or several pieces of digital information arranged side by side in addition to the foregoing digital picture signals.

A recorder microcomputer 91 communicates with a lens microcomputer 29. Through this communication, the recorder microcomputer 91 receives information regarding the angles of convergence, focal lengths, and base line lengths from the lens microcomputer 29. Among these pieces of information, information regarding the focal lengths is converted into information regarding the angles of view on the basis of the screen size of an image pick-up device. These pieces of information are transmitted to a processing circuit of a recorder unit, and recorded onto a recording medium (magnetic tape) 42 so that they are arranged side by side with picture signals or speech/sound signals.

The recorded information is read out together with picture or speech signals during reproduction, and output externally.

The signals are supplied to a reproducing device (display device) 5 in a state wherein they are arranged side by side with picture signals or speech/sound signals, so as to be used as the information for achieving proper stereoscopic image display.

In this embodiment, the focal length of a zoom lens ranges from 5 to 15 mm, and a ⅓-inch CCD is employed. The angle of view can be horizontally varied from 67 to 25 degrees, the base line length is fixed at 70 mm, and the angle of convergence can be varied from 0 to 3 degrees.

Information regarding whether the odd or even fields of picture signals input by switching for each field correspond to the picture signals for left eye or right eye is recorded onto the recording medium 42.

Thus, according to the present embodiment, first information regarding the focal length of a photographing optical system, second information regarding the base line length indicating the interval between the incident optical axes of a first photographing optical axis and a second photographing optical axis, and third information regarding the angle of convergence formed by the incident optical axes of the first photographing optical axis and the second photographing optical axis are transmitted in digital values to the main unit of a camera from the stereoscopic photographing lens unit that is mounted on the main unit of a camera, has the first photographing optical axis and the second photographing optical axis for left eye and right eye, respectively, and forms right and left parallaxes. The foregoing three types of information, which have been transmitted, and information regarding whether the odd or even fields of input picture signals correspond to the picture signals for left eye or right eye are recorded together with picture signals and speech signals in the form of digital values on a recording medium. It is possible, therefore, to make a proper setting for reproduction and display, permitting good stereoscopic images to be reproduced.

In this case, ideally, these pieces of information are stored in the same recording medium in which the information regarding photographed images is stored. For this purpose, recent digital image storing systems can be used, because they permit various types of information, including images and voice/sounds, to be digitized and recorded.

(Second Embodiment)

Figure 4:
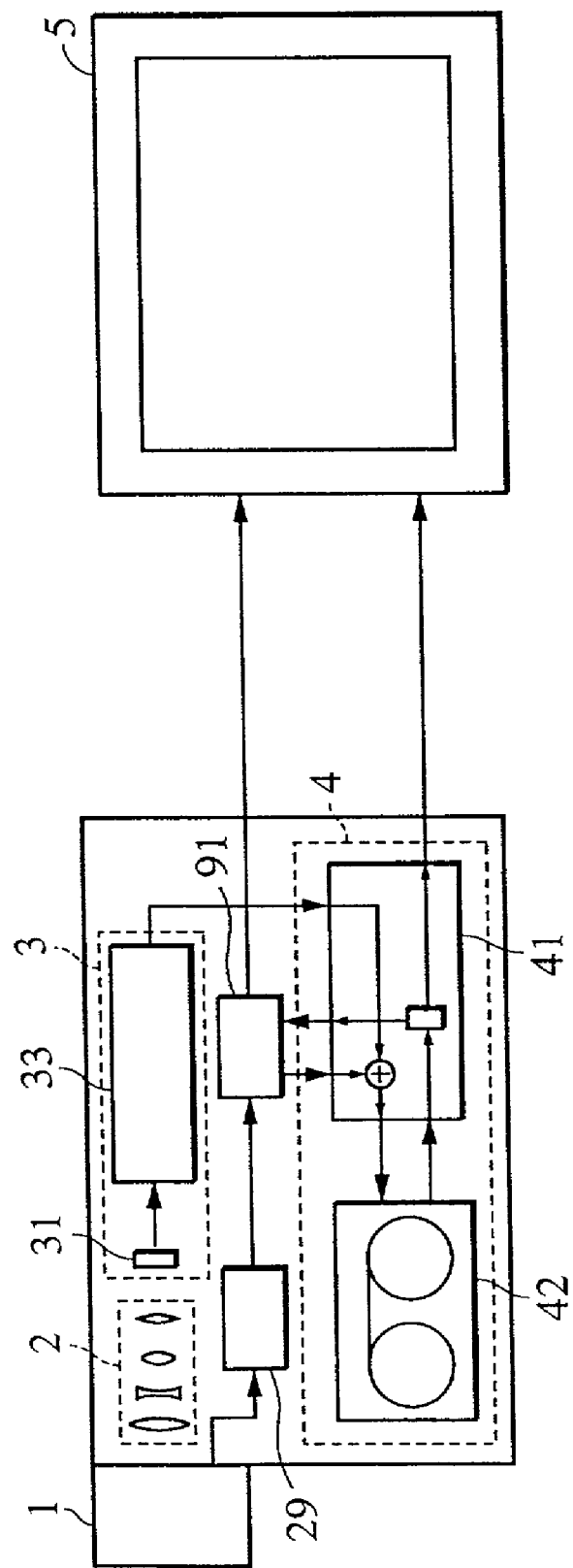
FIG. 4 shows a configuration of a photographing system according to a second embodiment.

FIG. 4 shows the configuration of a photographing system according to a second embodiment. The photographing system constitutes a digital animation photographing, recording, and reproducing apparatus, i.e., a "digital video camera" and reproducing device (display device).

Referring to FIG. 4, reference numeral 1 denotes an optical unit for stereoscopic photographing, and reference numeral 2 denotes an image forming optical unit that has zooming and focusing functions. A microcomputer 29 controls the optical unit 1 and the image forming optical unit 2, and has information regarding angles of convergence, focal lengths, and base line lengths.

Reference numeral 31 denotes an image pick-up device (CCD). An image obtained by the optical system described above is formed on the image pick-up device (CCD) 31. An output of the image pick-up device is processed by a signal processing circuit (CAM) 33 in the following stage so as to be converted into digital picture signals. The digital signals are transmitted to a recording circuit (REC) 41 of the following stage.

Reference numeral 4 denotes a recorder unit that permits recording of speech/sound signals that have been converted into digital values (not shown) or several pieces of digital information arranged side by side in addition to the foregoing digital picture signals.

A recorder microcomputer 91 communicates with a lens microcomputer 29. Through this communication, the recorder microcomputer 91 receives information regarding the angles of convergence, focal lengths, and base line lengths from the lens microcomputer 29. Among these pieces of information, information regarding the focal lengths is converted into information regarding the angles of view on the basis of the screen size of an image pick-up device. These pieces of information are transmitted to a processing circuit of a recorder unit, and recorded onto a recording medium (magnetic tape) 42 so that they are arranged side by side with picture signals or speech/sound signals.

The recorded information is read out together with picture or speech/sound signals during reproduction, and output externally.

The signals are supplied to a reproducing device (display device) 5 in a state wherein they are arranged side by side with picture signals or speech/sound signals, so as to be used as information for achieving proper stereoscopic image display.

As in the case of the foregoing embodiment, information regarding whether the odd or even fields of picture signals input by switching for each field correspond to the picture signals for left eye or right eye is recorded on the recording medium 42.

Thus, according to the present embodiment, the same advantages as those of the first embodiment can be obtained also in a photographing apparatus combined with a photographing lens unit into one piece.

(Third Embodiment)

Figure 5A:
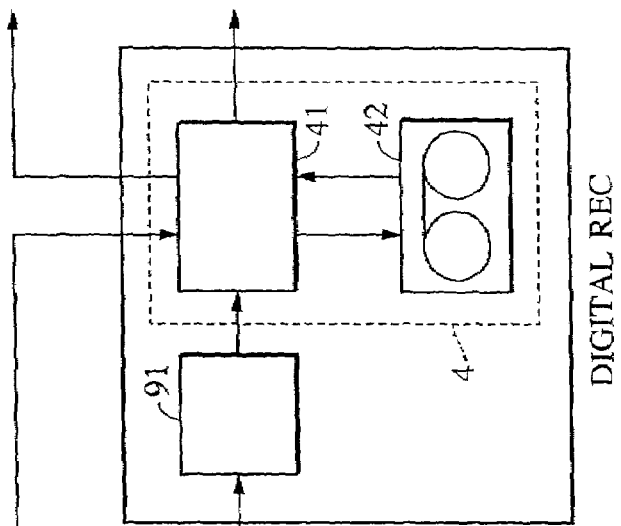
FIGS. 5A to 5C show a configuration of a photographing system according to a third embodiment.
Figure 5B:
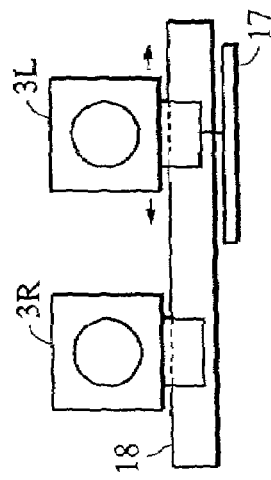
Figure 5C:
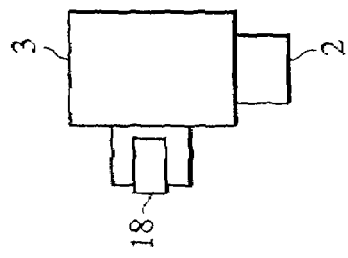

FIGS. 5A to 5C show the configuration of a photographing system according to a third embodiment. The system is adapted to photograph and record stereoscopic images by employing two synchronized cameras. In this system, the angle of convergence remains unchanged (parallel or zero degree), while the base line length is variable.

FIG. 5A is a top view showing the configuration of a camera unit, FIG. 5B is a front view showing the configuration of the camera unit, and FIG. 5C is a side view showing the configuration of the camera unit.

The camera unit for right eye is composed of a lens 2R and a camera 3R. The camera unit for left eye is composed of a lens 2L and a camera 3L.

The two sets of cameras are mounted on a single rail 18 such that the right unit is fixed, while the left unit is slidable on the rail to move in the directions of the arrows shown in FIG. 5B.

An interval, namely, base line length d, can be electrically known by an encoder 17 connected to the left camera. The outputs of an encoder 17 are transmitted to a microcomputer 29 where they are processed into digital information.

Reference numeral 32 denotes a circuit for synthesizing stereoscopic images, the circuit having two functions. One function is to generate video synchronizing signals, which are transmitted to the two sets of cameras, and synchronous picture signals can be output from the two sets of cameras.

The other function is to select pictures. Depending on whether the circuit is outputting even or odd video synchronizing signals, the circuit alternately selects and outputs images from right camera image output signals and left camera image output signals.

Thus, stereoscopic images based on the time sharing method are formed.

The microcomputer 29 outputs the information regarding the angles of convergence and the angles of view in addition to the aforesaid information regarding base line lengths. However, the values of the angles of convergence and the angles of view remain unchanged in the system, so that fixed values are always output.

The above three types of information are transmitted to a microcomputer of a recorder 91, and digitally recorded onto a recording medium 42 by a recording circuit 41 together with picture signals or speech/sound signals (not shown), etc., output from the synthesizing circuit 32.

The recorded information is read out together with picture or speech/sound signals during reproduction, and output externally.

In this embodiment, the focal length of a lens is fixed at 10 mm, and a ½-inch CCD is employed. Hence, the angle of view is horizontally fixed at 53 degrees, the base line length can be varied from 70 to 140 mm, and the angle of convergence is zero degrees.

Information regarding whether the odd or even fields of picture signals by switching for each field correspond to the picture signals for left eye (left side) or right eye (right side) is recorded onto the recording medium 42.

Thus, according to the present embodiment, the same advantages as those of the first and second embodiments can be obtained also in the photographing system for recording picture signals simultaneously input by the right-eye photographing apparatus and the left-eye photographing apparatus to a recording medium by switching the picture signals for each field.

As described above, according to the first through third embodiments, the details of stereoscopic conditions are sequentially recorded onto a recording medium, so that the information can be retained and transmitted, allowing further proper reproduction of stereoscopic images by using the information when reproducing and displaying the stereoscopic images. Thus, the present invention provides an advantage in that good stereoscopic images can be always reproduced.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A stereoscopic photographing lens unit for enabling a reproduction on a display of information needed to properly display and view a stereoscopic image produced by said lens unit that is attached to a camera main unit having a recording medium on which picture signals representing an image formed by the stereoscopic photographing lens unit are recorded, the stereoscopic photographing lens unit having a first photographing optical axis and a second photographing optical axis and comprising:

control means for controlling a photographing optical system including said stereoscopic photographing lens unit; and means for providing the information to the recording medium that is to be reproduced on the display and that is needed to properly display and view the stereoscopic image produced by said stereoscopic photographing lens unit by transmitting the information of the photographing optical system that is needed to properly display and view the stereoscopic image produced by said stereoscopic photographing lens unit to the recording medium in the camera main unit for recordation on the recording medium together with the picture signals in such a manner so as to permit reading out and display of the information with the picture signals from the recording medium during reproduction of the picture signals, wherein the information transmitted to the recording medium by said providing means comprises at least one of:

first information regarding a focal length of the photographing optical system;

second information regarding the interval between the incident optical axes of the first photographing optical axis and the second photographing optical axis; and third information regarding the angle formed by the incident optical axes of the first photographing optical axis and the second photographing optical axis to the camera main unit in the form of digital values.

2. A stereoscopic photographing lens unit according to claim 1, wherein the information transmitted by said providing means to the recording medium comprises all of the first information, the second information, and the third information.

3. A stereoscopic photographing lens unit according to claim 1, further comprising: the recording medium for storing the information.

4. A stereoscopic photographing lens unit according to claim 1, wherein the stereoscopic photographing lens unit is interchangeable with respect to the camera main unit, and transmits the information of the photographing optical system through a mounting contact to the camera main unit.

5. A stereoscopic photographing apparatus for enabling the reproduction on a display of information needed to properly display and view a stereoscopic image produced by said stereoscopic photographing apparatus that has a first photographing optical axis and a second photographing optical axis, and switches picture signals for a left eye and a right eye, respectively, for each field through the intermediary of the respective photographic optical axes before inputting an image formed by said stereoscopic photographic apparatus in the form of the picture signals for the left eye and the right eye to recording means for recordation, comprising:

a photographing optical system including the first and second photographic optical axes;

control means for controlling said photographing optical system; and means for providing the information to the recording means that is to be reproduced on the display and that is needed to properly display and view the stereoscopic image produced by said stereoscopic photographing apparatus comprising said recording means for recording the information of said photographing optical system that is needed to properly display and view the stereoscopic image produced by said stereoscopic photographing apparatus, wherein the information includes information regarding whether the odd/even field of an input picture signal corresponds to the picture signal for left eye or right eye, wherein said recording means records the information regarding whether the odd/even field of an input picture signal corresponds to the picture signal for left eye or right eye to the recording means in the form of digital values, together with picture signals representing an image formed by said stereoscopic photographic apparatus or picture signals representing an image formed by said stereoscopic photographic apparatus and speech signals in such a manner to permit reading out of the information with the picture signals or the picture signals and the speech signals from the recording means to the display during reproduction of the picture signals.

6. A stereoscopic photographing apparatus according to claim 5, wherein the information that is to be reproduced on the display and that is needed to properly display and view the stereoscopic image produced by said stereoscopic photographing apparatus, which is recorded by said recording means together with the picture signals or the picture signals and speech signals also comprises first information regarding the focal length of the photographing optical system, second information regarding an interval between the incident optical axes of the first photographing optical axis and the second photographing optical axis, and third information regarding the angle formed by the incident optical axes of the first photographing optical axis and the second photographing optical axis to the recording means, and also records fourth information, which is the information regarding the angle of view calculated from the screen size of an image pick-up device and the first information.

7. A photographing system for enabling a reproduction on a display of information needed to properly display and view a stereoscopic image produced by said photographing system and for recording picture signals simultaneously input by a right-eye photographing apparatus and a left-eye photographing apparatus to a recording medium by switching the picture signals for each field, the picture signals respectively representing images produced by an optical system of the right-eye and left-eye photographing apparatuses, said photographing system comprising:

control means for controlling the right-eye and left-eye photographing apparatuses; and means for providing the information to the recording medium that is to be reproduced on the display and that is needed to properly display and view the stereoscopic image produced by said photographing systems, wherein the information comprises information regarding whether the odd/even field of an input picture signal corresponds to a picture signal for a left eye or a right eye representing an image produced by the optical system of the right-eye or the left-eye photographing apparatuses, wherein said providing means comprises recording means for recording on the recording medium the information regarding whether the odd/even field of an input picture signal corresponds to a picture signal for a left eye or a right eye in the form of digital values, together with picture signals representing images produced by the optical system of the right-eye or the left-eye photographing apparatuses or picture signals representing an image produced by the optical system of the right-eye or the left-eye photographing apparatuses and speech signals in such a manner as to permit reading out of the information with the picture signals or the picture signals and the speech signals from the recording medium to the display during reproduction of the picture signals.

8. A photographing system according to claim 7, wherein the information that is to be reproduced on the display and that is needed to properly display and view the stereoscopic image produced by said photographing system, which is recorded by recording means together with the input picture signal also comprises first information regarding the focal length of the photographing optical system, second information regarding an interval between the incident optical axes of a first photographing optical axis and a second photographing optical axis, and third information regarding the angle formed by the incident optical axes of the first photographing optical axis and the second photographing optical axis to the recording medium, and also records fourth information, which is the information regarding the angle of view calculated from the screen size of an image pick-up device and the first information.

9. A unit according to claim 1, wherein said providing means transmits the information of the photographing optical system to the recording medium in the camera main unit for recordation on the recording medium side by side with the picture signals.

10. The stereoscopic photographing apparatus according to claim 5, wherein said recording means records the information side by side with the picture signals or the speech signals.

11. The photographing system according to claim 7, wherein said recording means records the information side by side with the picture signals or the speech signals.

* * * * *

UNITED STATES PATENT AND TRADEMARK OFFICE
CERTIFICATE OF CORRECTION

PATENT NO. : 7,148,916 B2
APPLICATION NO. : 09/893611
DATED : December 12, 2006
INVENTOR(S) : Akihiro Fujiwara It is certified that error appears in the above-identified patent and that said Letters Patent is hereby corrected as shown below:

<u>ON THE TITLE PAGE, AT ITEM (57), ABSTRACT</u>
Line 14, "odd!even" should read --odd/even--.

Figure 6:
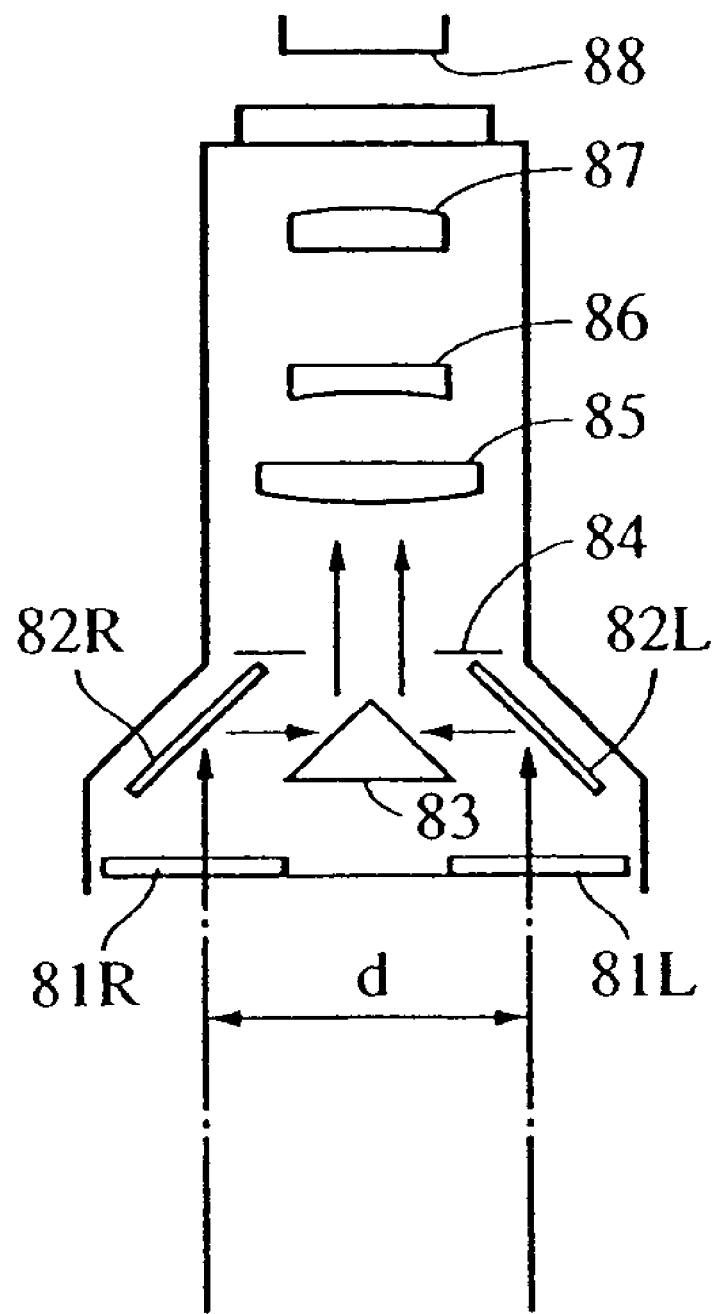
FIG. 6 shows a configuration of a photographing lens unit according to a conventional example.

<u>IN THE DRAWINGS</u>:
Sheet 6, Figure 6, should be labeled as --PRIOR ART--.

<u>COLUMN 9</u>:
Line 42, "comprises" should read --comprises:--.

<u>COLUMN 10</u>:
Line 8, "systems," should read --system,--.
Line 35, "comprises" should read --comprises:--.

Signed and Sealed this

Twenty-ninth Day of July, 2008

JON W. DUDAS
*Director of the United States Patent and Trademark Office*